United States Patent [19]

Kainuma et al.

[11] 4,427,906
[45] Jan. 24, 1984

[54] VIBRATING COMPRESSOR

[75] Inventors: Hiroyuki Kainuma, Kumagaya; Tadayoshi Kimura, Nitta, both of Japan

[73] Assignee: Sawafuji Electric Co., Ltd., Japan

[21] Appl. No.: 242,427

[22] Filed: Mar. 11, 1981

[30] Foreign Application Priority Data

Mar. 13, 1980 [JP] Japan .................................. 55-31926
Mar. 13, 1980 [JP] Japan ............................ 55-32856[U]

[51] Int. Cl.³ ............................................ H02K 33/18
[52] U.S. Cl. ........................................ 310/27; 417/416
[58] Field of Search ....................... 310/20, 23, 27, 13; 417/416

[56] References Cited

U.S. PATENT DOCUMENTS 2,764,702  9/1956  Mason .................................... 310/15
4,121,125 10/1978  Dölz ....................................... 310/27

Primary Examiner—Donovan F. Duggan
Assistant Examiner—Anita Ault
Attorney, Agent, or Firm—McGlew and Tuttle

[57] ABSTRACT

A vibrating compressor having ferrite magnets formed into arc-shaped pieces the center angle of which includes 360° and disposed along the internal circumference of a cup-shaped external iron core, a cylindrical magnetic pole facing with the ferrite magnets at a predetermined gap, and an electromagnetic coil vibratably supported by a mechanical vibration system in an annular magnetic gap defined by the ferrite magnets and the cylindrical magnetic pole, wherein magnetic flux density in the annular magnetic gap is maintained uniform by at least making the axial length of the ferrite magnets larger than the length of the cylindrical magnetic pole, and the relative position of the ferrite magnets and the electromagnetic coil is selected so as to ensure the precise switching of drive current flowing through the electromagnetic coil.

4 Claims, 20 Drawing Figures

FIG. 5A
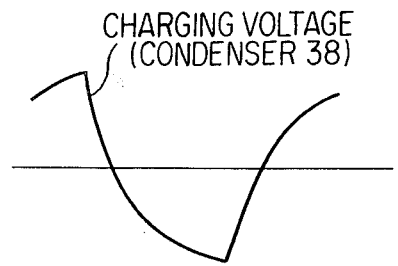
FIG. 5B
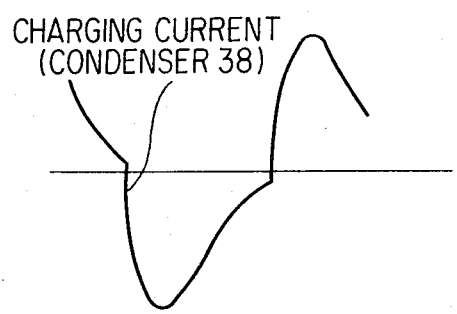
FIG. 5C
FIG. 5D
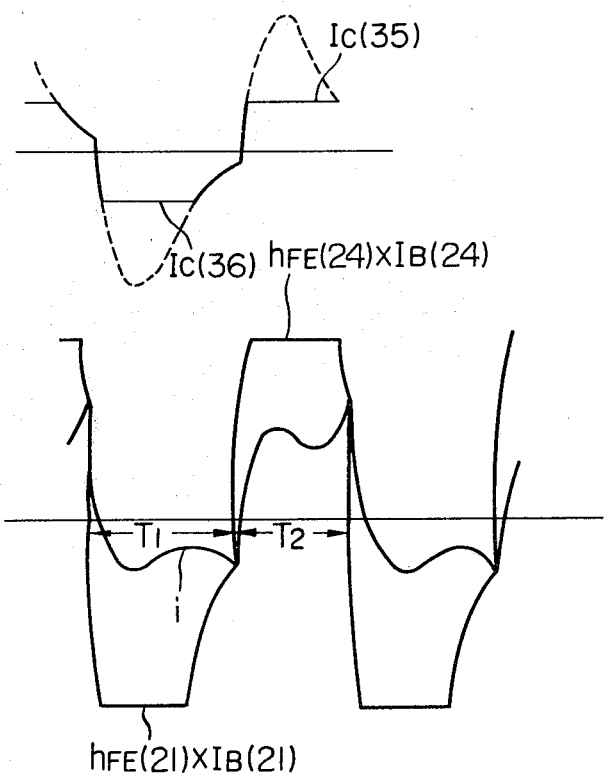

VIBRATING COMPRESSOR

BACKGROUND OF THE INVENTION

1. Field of the Invention

This invention relates generally to a vibrating compressor, and more particularly to a vibrating compressor wherein ferrite magnets are employed as the permanent magent for applying magnetic field to an annular magnetic gap in which an electromagnetic coil driven by an electrical vibration system is disposed, and the operation thereof is maintained at the optimum condition at all times by ensuring uniform magnetic flux density in the annular magnetic gap and causing the electrical vibration system to positively vibrate in such a manner as to coincide with the intrinsic vibration period of a mechanical vibration system.

2. Description of the Prior Art

In general, the vibrating compressor has such a construction that a mechanical vibration system comprising a spring, and an electrical vibration system driving the mechanical vibration system are adapted to resonate with each other, based on the operating principle of a dynamic loudspeaker consisting of a magnet and a voice coil. In other words, the operation of the vibrating compressor can be compared to that of a synchronous motor.

Vibrating compressors of this type are now widely used in such applications as small-sized household refrigerators and mobile refrigerators used on board automobiles and boats.

Heretofore, alnico magnet has been widely used as a permanent magnet in this type of vibrating compressor. Because of its high cobalt content, the price of the alnico magnet has substantially increased as the price of cobalt has increased in recent years. As a result, ferrite magnet has attracted increasing attention as an alternative magnet available at lower cost. The present inventor and others have already proposed a vibrating compressor using the ferrite magnet (Japanese patent application No. 84108-1979). As suggested in the above patent application, the ferrite magnet, when used in such an application, is required to be of a flat shape with a larger crosssectional area and smaller thickness than the alnico magnet. As a result, when the ferrite magnet is used in place of the alnico magnet hitherto used in the vibrating compressor, due consideration must be given to the arrangement of the ferrite magnet. In some cases, the external shape of the conventional vibrating compressor may have to be changed unwantedly, or the outside diameter of the compressor may have to be increased. This requires the ferrite magnet to be formed into an arc shape or to be disposed along with the internal circumference of the external iron core.

When the arc-shaped ferrite magnet is used, as described above, the state of the annular magnetic gap in which the electromagnetic coil is reciprocated has important relations with the switching operation of the drive current fed to the electromagnetic coil. It is therefore desired that the relative position of the arc-shaped ferrite magnet and the reciprocating range of the electromagnetic coil be properly selected. It is also desired that magnetic flux density in the annular magnetic gap be maintained as uniform as possible.

SUMMARY OF THE INVENTION

It is an object of this invention to provide a vibrating compressor using an arc-shaped ferrite magnet wherein the arc-shaped ferrite magnet is disposed in such a manner that magnetic flux density in an annular magnetic gap is maintained uniform.

It is another object of this invention to provide a vibrating compressor wherein the relative position of the arc-shaped ferrite magnet and the reciprocating range of an electromagnetic coil are properly selected so that the drive current flowing in the electromagnetic coil is precisely switched.

It is still another object of this invention to provide a vibrating compressor using the arc-shaped ferrite magnet wherein consideration is given to the method of mechanical connection of a cylinder block and an external iron core so as to prevent the outside diameter of the vibrating compressor from being unwantedly increased.

It is a further object of this invention to provide a vibrating compressor using the arc-shaped ferrite magnet wherein consideration is given to the arrangement of a discharge pipe which is led longitudinally from one end to the other end of the vibrating compressor so as to prevent the outside diameter of the vibrating compressor from being unwantedly increased.

Other and further objects, features and advantages of this invention will appear more fully from the following description taken in connection with the accompanying drawings.

BRIEF DESCRIPTION OF THE DRAWING

FIGS. 1 through 5 are diagrams of assistance in explaining the operating principle of this invention.

DETAILED DESCRIPTION OF THE EMBODIMENT

In general, a vibrating compressor has such a construction that an electromagnetic coil is vibratably disposed in a stationary magnetic field, and is driven by an alternting current fed from the outside. In other words, the vibrating compressor has essentially the same operating principle as that of a movingcoil type loudspeaker in that an alternating current is fed to the moving coil (referred to as an electro-magnetic coil for the purpose of this invention) so as to cause resonance in a mechanical vibration system including a resonating spring supporting the electromagnetic coil.

Figure 1:
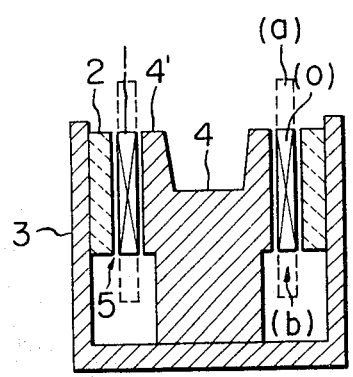

In the following, the operation of this type of vibrating compressor will be described. FIG. 1 illustrates the basic construction of a vibrating compressor using ferrite magnets. In the figure, reference numeral 1 refers to an electromagnetic coil supported by a spring (not shown) to comprise a mechanical vibration system; 2 to ferrite magnets in an arc shape along the internal circumference of an external iron core 3; 4 to an internal iron core with a magnetic pole 4'; 5 to an annular magnetic gap defined by the ferrite magnets 2 and the magnetic pole 4', in which the electromagnetic coil 1 is vibratably disposed.

In the vibrating compressor used in a refrigerator, a piston (not shown in FIG. 1) is connected to the electromagnetic coil 1 and vibratably supported by the spring (also not shown) so that a cooling medium is compressed, by the action of the piston caused by the vibration of the electromagnetic coil 1, for adiabatic expansion in the refrigerator.

It is known that, in this type of vibrating compressor, the need for compressing the cooling medium, as described above, causes a difference in the length of time between a half period representing a suction time $T_1$ and a half period representing a compression time $T_2$, as comprising one cycle of the intrinsic vibration period.

Figure 2A:
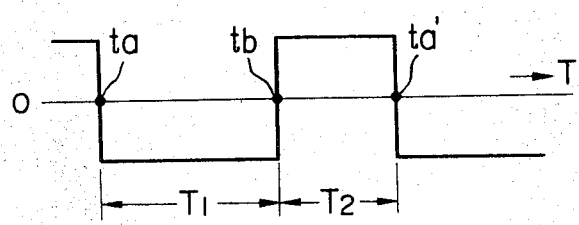

Consequently, an inverter for driving the vibrating compressor must be controlled in such a manner that the output voltage waveform thereof becomes an alternating voltage waveform as shown in FIG. 2A and coincides with the suction time $T_1$ and the compression time $T_2$. Conventionally, the so-called transistor inverter based on the switching characteristics of transistors has been used as an inverter for converting direct current into alternating current. In this type of inverter, switching control is effected using the following switching characteristics of a transistor.

That is, assuming that the collector current of a transistor is $I_C$, the base current thereof is $I_B$ and the amplification factor thereof is $h_{FE}$, that transistor remains in a saturation region as long as $$I_C \leq I_B \times h_{FE}$$

and enters into an active region when $$I_C \geq I_B \times h_{FE}.$$

Now, the switching control operation will be described in more detail.

Figure 2B:
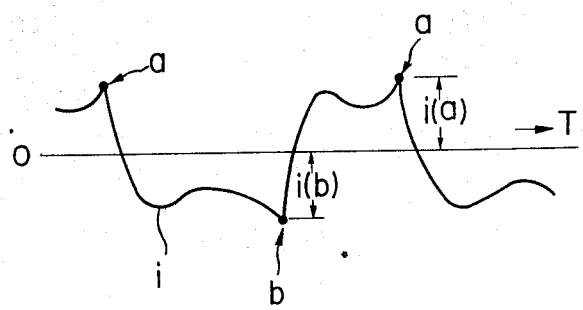

Assume that the alternating on-off operation of two switching transistors causes an alternating voltage of square waveform as shown in FIG. 2A to be applied on the electromagnetic coil 1 shown in FIG. 1 to cause the electromagnetic coil 1 to move upward and downward between the state shown by arrow (a) in FIG. 1 and the state shown by arrow (b). The state (a) represents the position of the electromagnetic coil 1 corresponding to the completion of compression while the state (b) represents the position of the coil 1 corresponding to the completion of suction. Drive current i of the electromagnetic coil 1, which is the collector currents $I_C$ of the respective transistors, is shown in FIG. 2B.

In FIG. 2A, time $t_a$ represents a point of time at which the vibrating compressor completes the compression process and starts the suction process. That is, at time $t_a$, the voltage applied to the electromagnetic coil 1 is switched over from positive to negative in polarity. Consequently, the electromagnetic coil 1 is caused to move, at time $t_a$, from the position shown by arrow (a) in FIG. 1 toward the direction of suction (downward). During this period, magnetic flux acting on the electromagnetic coil 1 gradually increases, reaches the highest level when the coil 1 arrives at the position shown by arrow (o) in FIG. 1, and thereafter decreases gradually. This causes the counter EMF induced across the electromagnetic coil 1 to increase temporarily, and then to decrease. Accordingly, the drive current i flowing in the electromagnetic coil 1, while resisting against the counter EMF rapidly increases in the negative direction, and after a temporary drop, further increases, as shown in FIG. 2B. The switching operation can be effected at the desired timing, that is, at the time when the electromagnetic coil 1 reaches the desired position for completion of suction (shown by arrow (b) in FIG. 1), or at the time when the drive current i reaches point (b) in FIG. 2B by selecting transistors having such an amplification factor $h_{FE}$, as to satisfy the aforementioned switching condition;

$$I_C = i(b) \geq I_B \times h_{FE}$$

and controlling the base current $I_B$ of the transistors since the collector current $I_C$ of a transistor being switched is the aforementioned drive current i. (The controlling method of the base current $I_B$ will be described later.) Simultaneously with a transistor being turned off in accordance with the abovementioned switching condition, another transistor applying a positive voltage to the electromagnetic coil 1 is turned on, whereby the drive current flows in the electromagnetic coil 1 in the opposite direction, causing the electromagnetic coil 1 to move from position (b) to position (a) in FIG. 1. The reversing operation of the electromagnetic coil 1 at position (a), or the switching operation of the drive current at position (a) in FIG. 2B is performed in the same manner as in the reversing operation, that is the switching operation at point (b) in FIG. 2B. In order to ensure positive switching at points (a) and (b) in FIG. 2B, the rate of change of the drive current i in the electromagnetic coil 1 at points (a) and (b) is desirable to be as large as possible. As described earlier, the changes in the drive current i are caused by changes in the counter EMF induced across the electromagnetic coil 1; the lower the counter EMF the higher becomes the drive current. The counter EMF tends to decrease with decreasing magnetic flux intersecting the electromagnetic coil 1. That is, the more the electromagnetic coil 1 protrudes from the annular magnetic gap 5 shown in FIG. 1, the lower becomes the counter EMF. Consequently, in order to ensure positive switching at points (a) and (b) shown in FIG. 2, it is necessary to make the protrusion of the electromagnetic coil 1 from the annular magnetic gap 5 as large as possible both at the completion of compression and suction. Due to the limited amplitude of vibration of the electromagnetic coil 1, however, if the amount of protrusion (the portion shown by arrow (a) in FIG. 1) of the electromagnetic coil 1 at the completion of compression is made too large, the amount of protrusion (the portion shown by arrow (b) in FIG. 1) at the completion of suction becomes smaller, and vice versa. Though not shown in FIG. 1, two resonating springs vibratably support the electromagnetic coil 1, as described above, and the electromagnetic coil, being caused to vibrate as the alternating voltage shown in FIG. 2A is applied thereto. During this vibration, or during the operation of the vibrating compressor, the electromagnetic coil 1 moves more in the suction process than in the compression process, with respect to the position thereof when the alternating current is not applied (hereinafter referred to as the neutral position). This is because, during the compression process to compress the cooling medium, the resiliency of the cooling medium acts on the electromagnetic coil 1. If the electromagnetic coil 1 is disposed so that the center point of the electromagnetic coil 1 in the non-driven state, or at the neutral point, coincides with the center point of the annular magnetic gap 5, the amount of protrusion of the coil 1 at the completion of compression (shown by arrow (a) in FIG. 1) becomes relatively smaller while the amount of protrusion thereof at the completion of suction (shown by arrow (b) in FIG. 1) becomes larger. In this case, however, there is a danger of the switching operation at the completion of compression becoming unstable. In order to ensure positive switching operation both at the completion of compression and suction, therefore, the amounts of protrusion of the electromagnetic coil 1 at the completion of compression and suction (shown by arrows (a) and (b) in FIG. 1) should preferably be equal to each other. To attain this, careful consideration should be given, in determining the neutral position of the electromagnetic coil 1, to the difference in the stroke of the electromagnetic coil 1 between the compression and suction processes.

In addition, to ensure the effective operation of the vibrating compressor, it is desired that magnetic flux in the annular magnetic gap in which the electromagnetic coil 1 is disposed be maintained uniform. However, the ferrite magnets 2 used in the vibrating compressor shown in FIG. 1 are formed, mainly from considerations of the magnetic properties thereof, into such a shape that the thickness thereof is made thinner and the crosssectional area thereof larger with respect to the direction of magnetization. This leads to increased leakage flux in the through-thickness direction in the vicinity of the end face of the ferrite magnets 2. Consequently, the ferrite magnets 2 facing with the magnetic pole 4' in the same surface area as that of the magnetic pole 4', as shown in FIG. 1, tend to have uneven magnetic flux density in the annular magnetic gap 5 due to the abovementioned leakage flux. From these considerations, this invention makes it possible to obtain uniform flux density in the annular magnetic gap in which the electromagnetic coil constituting the mechanical vibration system as well as to drive the electrical vibration system in synchronism with the intrinsic vibration period of the mechanical vibration system.

Prior to the description of the vibrating compressor of this invention, a general description of the relationship between the mechanical vibration and electrical vibration systems as well as a description of an inverter and the switching operation thereof will be given in the following with reference to FIGS. 3 through 5.

As described above, it is generally known that there is a difference in the length of time between half period representing a compression time $T_2$ and a half period representing a suction time $T_1$ in one cycle of the intrinsic vibration period of the mechanical vibration system, and that there is a difference in the amplitude of the mechanical vibration system between the compression and suction strokes of the electromagnetic coil with respect to the neutral position, where the electromagnetic coil is in the stationary state, due to the high pressure applied by the cooling medium during compression process.

Figure 3A:
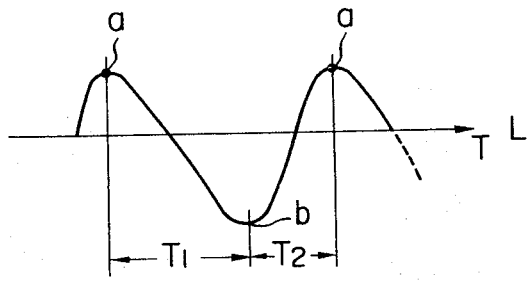
Figure 3B:
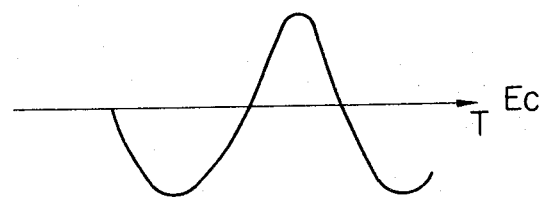
Figure 3C:
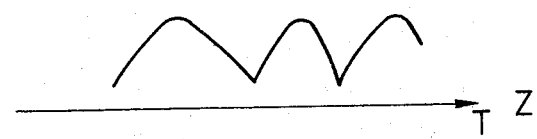

FIG. 3A shows an amplitude waveform of the mechanical vibration system. In the figure, the positive direction, the negative direction and the zero point in the ordinate represent the direction of compression, the direction of suction and the neutral position, or the position at which the mechanical vibration system is in the stationary state, respectively. Changes in the amplitude L, as shown by the amplitude waveform in FIG. 3A, cause a counter EMF $E_C$ as shown in FIG. 3B to be induced across the electromagnetic coil of the vibrating compressor. The waveform of the counter EMF as generated in accordance with the amplitude changes shown in FIG. 3A becomes zero at the points of time corresponding to the time of completion of compressions (a) and the time of completion of suction (b), as shown in FIG. 3B. Furthermore, the waveform of the counter EMF forms a somewhat distorted one, instead of a perfect sinusoidal wave, because of the time difference in amplitude between the compression time $T_2$ and the suction time $T_1$. Consequently, the waveform indicating the change with time of the equivalent impedance Z of the electromagnetic coil assumes a waveform which is formed by superimposing the counter EMF waveform shown in FIG. 3B on the predetermined fundamental values, as shown in FIG. 3C.

Figure 3D:
Figure 3E:
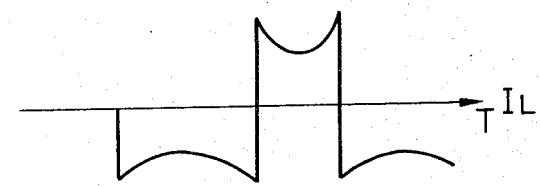

Now, assume that a square wave voltage $V_1$ shown in FIG. 3D, which is in phase with the counter EMF shown in FIG. 3B, is applied to the electromagnetic coil. A current $I_L$ flowing through the electromagnetic coil reaches the maximum level at the minimum impedance value and the minimum level at the maximum impedance value and is in phase with the square wave voltage $V_1$, as shown in FIG. 3E.

Figure 3F:
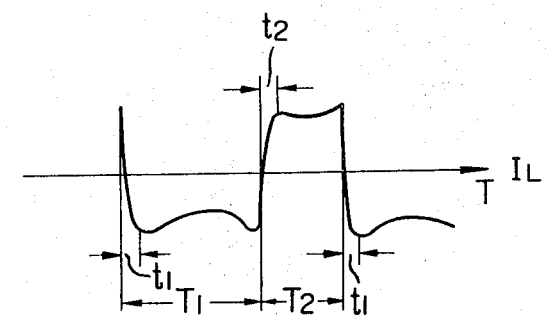

In practice, however, the actual current $I_L$ does not rise up vertically because of the reactance of the electromagnetic coil as well as of the drive power circuit, but rises in the curved form due to the delay of time $t_2$ in the compression stroke, or of time $t_1$ in the suction stroke, which is required for the current value to reach the maximum level as shown in FIG. 3F.

The above discussion reveals that the voltage waveform fed to the electromagnetic coil should ultimately be in phase with the amplitude of the vibrating compressor to maintain the operation of the vibrating compressor at the maximum efficiency as shown in FIG. 3F. A circuit diagram of an inverter for converting a d-c source voltage to an alternating voltage in phase with the amplitude of the vibrating compressor is shown in FIG. 4 and diagrams illustrating the operation thereof are shown in FIGS. 5A through 5D.

Figure 4:
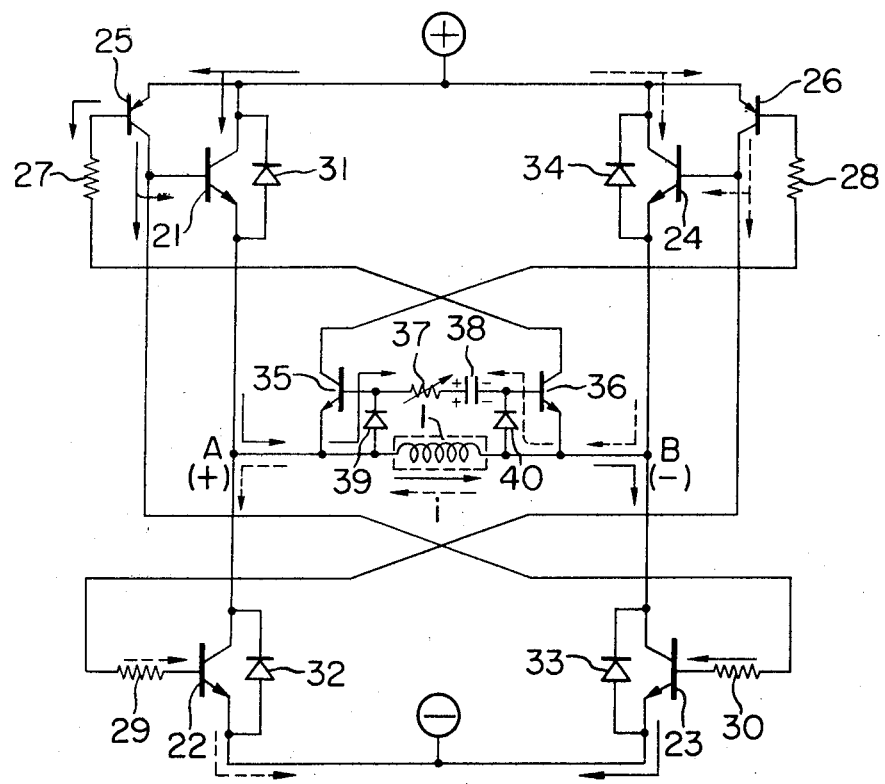

In FIG. 4, numeral 1 refers to an electromagnetic coil; 21 through 24 to main switching elements, for example, transistors which are bridge-connected with each other, transistors 21 and 23 and transistors 22 and 24 forming pairs alternately repeating on-off operations; 25 and 26 to transistors for supplying currents to the bases of the transistors 21 and 23 and the transistors 22 and 24, respectively; 27 and 28 to resistors for controlling the collector currents of transistors 36 and 35, that is, the base currents of the transistors 25 and 26; 29 and 30 to resistors for controlling the base currents of the transistors 22 and 23; 31 through 34 to diodes for protecting the transistors 21 through 24 in an event of reversed connection of the d-c power source and forming a discharge circuit for a capacitor 38. Numerals 35 and 36 refer to detecting/switching elements, for example, transistors for detecting the charging/discharging current of a capacitor 38 and for controlling the transistors 21 through 24 as will be described later; 37 to a variable resistor for controlling the charging/discharging current of a capacitor 38; 38 to a capacitor connected in parallel with the electromagnetic coil 1 via the transistors 35 and 36; 39 and 40 to diodes forming a charging path for the capacitor 38. The transistors 35 and 36, the capacitor 38, the variable resistor 37 and the diodes 39 and 40 form a detecting means.

Assuming that a d-c source voltage having the polarity shown in the figure is applied and the terminals A and B become positive and negative, respectively, the capacitor 38 is charged via the diode 39 and the variable resistor 37, as shown by solid lines in the figure. At this time, the charging current supplies a base current to the transistor 36, causing the transistor 36 to turn on. The transistor 25 is then turned on, causing the transistors 21 and 23 to turn on, thus causing a drive current to flow through the electromagnetic coil 1. The current flowing through the circuit at this time is in the direction shown by solid lines in the figure.

The charging voltage of the capacitor 38 in this case is as shown in FIG. 5A while the current thereof is as shown in FIG. 5B. That is, as soon as the transistors 21 and 23 are switched from the OFF state to the ON state, a charging current is fed to the capacitor 38 in accordance with the time constant determined by the resistance value of the circuit (the resistance value of the variable resistor 37 and the resistance value of other circuit elements) and the capacitance value of the capacitor 38. However, the charging current comes to show a decreasing tendency as the charging voltage approaches to the voltage across the terminals A and B. Since the charging current serves to supply a base current $I_B$ (36) to the transistor 36, the collector current $I_C$ (36) of the transistor 36 assumes the waveform shown by broken lines in FIG. 5C. Due to the current limiting effect of the resistor 27, however, the actual collector current $I_C$ (36) assumes the waveform shown by solid lines in FIG. 5C.

The transistor 21 remains in the saturation region insofar as the collector current $I_C$ (21) thereof satisfies $$I_C(21) \leq I_B(21) \times h_{FE}(21)$$

but enters into the active region when the collector current $I_C$ (21), that is the drive current is
$$I_C(21) = i \geq I_B(21) \times h_{FE}(21)$$

When the transistor 21 enters into the active region, the voltage across the collector and emitter of the transistor 21 drops, causing the voltage across the terminals A, thus causing the capacitor 38 to start discharging. It should be noted that the base current $I_B$ (21) of the transistor 21 is proportional to the collector current $I_C$ (36) of the transistor 36. The discharging circuit here is formed mainly by the capacitor 38, the variable resistor 37, the transistor 35, the diode 31, the transistor 24 and the diode 40, or by the capacitor 38, the variable resistor 37, the transistor 35, the transistor 22, the diode 33 and the diode 40, due to the inductance of the electromagnetic coil 1. The discharging current flowing through the discharging circuit feeds a base current to the transistor 35, causing the transistor 35 to turn on, and thereby the transistors 22 and 24 are turned on simultaneously. In addition, since the discharging current acts to bring the transistor 36 which has been turned off into the more heavily turned-off state, the transistors 21 and 23 are also turned off more heavily simultaneously with the switching of the transistor 36. Consequently, the drive current i begins to flow in the direction shown by broken lines in the figure, contrary to the state where the transistors 21 and 23 are in the ON state.

The process of the subsequent circuit operation until the transistors 22 and 24 are turned off is essentially the same as that in the case where the transistors 21 and 23 are in the ON state because of the symmetrical circuit configuration as shown in FIG. 4. However, the conduction time of the pair of the transistors 21 and 23 is different from that of the pair of the transistors 22 and 24 in accordance with the difference between the suction time $T_1$ and the compression time $T_2$, as shown in FIG. 3. This can be explained as follows.

The waveform $h_{FE}(21) \times I_B(21)$ and the waveform $h_{FE}(24) \times I_B(24)$ as shown in FIG. 5D are symmetrical but of opposite polarity because the one detection means (the diode 39, the variable resistor 37, the capacitor 38 and the transistor 36) is symmetrical with the other detection means (the diode 40, the capacitor 38, the variable resistor 37 and the transistor 35). However, the drive current i (that is, the collector currents $I_C(21)$ and $I_C(24)$) is unsymmetrical with respect to the polarity thereof, as shown in FIG. 3F, due to the characteristics of the mechanical vibration system.

As a result, the point of time at which the abovementioned switching condition $$I_C \geq I_B \times h_{FE}$$

is satisfied differs for the positive and negative half waves. Thus, switching action is accomplished in such a manner as to coincide with the desired suction time $T_1$ and compression time $T_2$. As is evident from the above equation for switching condition, the higher the increase rate of the collector current $I_C$ (that is, the drive current i) is, the more positively the switching action can be accomplished.

Now, a vibrating compressor constructed so as to satisfy the abovementioned conditions according to this invention will be described in what follows.

In FIG. 6 illustrating a vibrating compressor embodying this invention, reference numerals 1 through 5 correspond to like numerals in FIG. 1; 6 and 7 to resonating springs; 8 to a coil support; 9 to a piston; 10 to a suction valve; 11 to a compression cylinder; 12 to a discharge valve; 13 to a cylinder block; 14 to a distance case; 15 to a bolt; 16 to a suction port; 16' to an internal suction pipe; 17 to a discharge port; 17' to a discharge pipe; 18 to a lead terminal; 18' to a lead wire; and 19 to a housing, respectively.

Figure 6A:
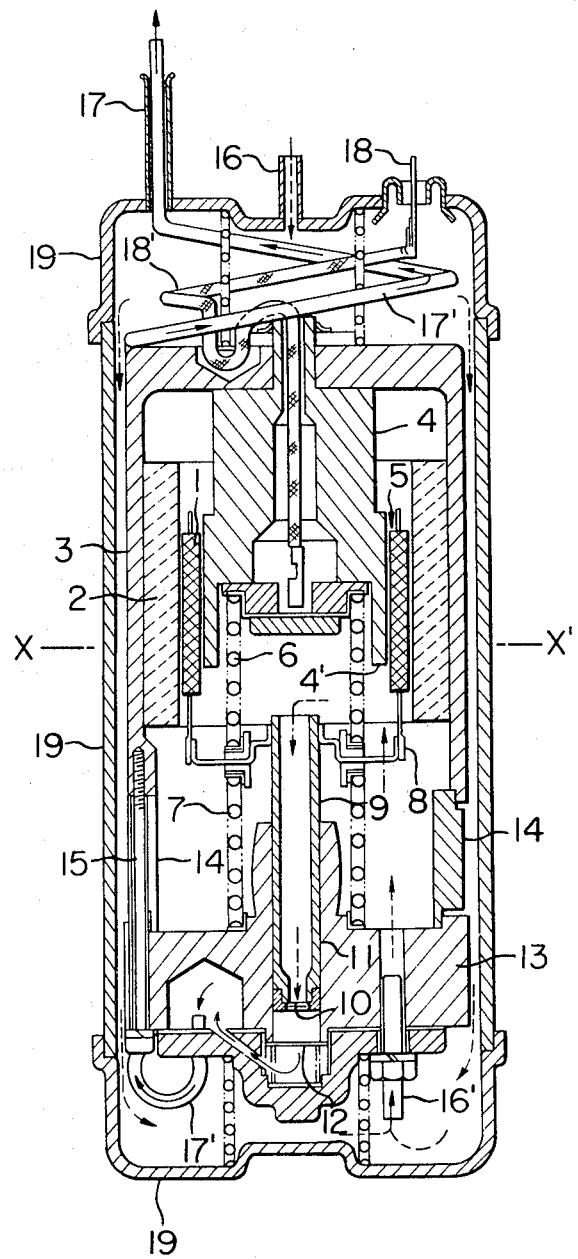
FIG. 6A is a crosssectional side elevation of a vibrating compressor according to this invention.
Figure 6B:
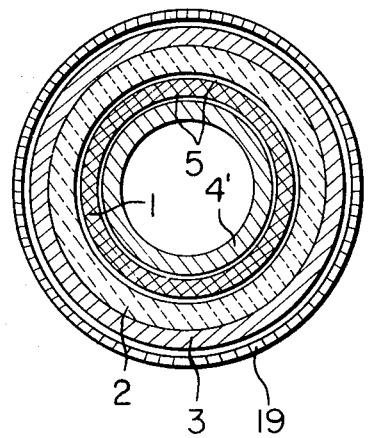
FIG. 6B is a crosssection taken substantially along the line X—X' of FIG. 6A.

As described in the beginning of this Specification, ferrite magnets 2 are used as the permanent magnet in this invention. The ferrite magnets 2 are formed into an arc shape, as shown in FIG. 6, in consideration of the magnetic properties thereof and the need to reduce the outside diameter of the vibrating compressor, and disposed along the internal circumference of the cup-shaped external iron core 3. The ferrite magnets 2 are magnetized in the through-thickness direction, that is radially in FIG. 6B. Consequently, a magnetic space (hereinafter referred to as an annular magnetic gap 5) is formed in a space defined by the ferrite magnets 2 and the magnetic pole 4' of the internal iron core 4 which constitutes a magnetic path, together with the external iron core 3. In the annular magnetic gap 5, disposed in an electromagnetic coil 1 which is vibratably supported by an opposing pair of resonating springs 6 and 7 via the coil support 8. The piston 9 is constructed substantially integrally with the electromagnetic coil 1 via the coil support 8, and driven by the electromagnetic coil 1. The cylinder block 13 having the compression cylinder 11 which accommodates the piston 9 is fixed to the external iron core 3 with the cylinder fixing bolt 15 via the distance case 14. In the vibrating compressor constructed in this fashion, when an alternating current is fed to the electromagnetic coil 1 via the lead terminal 18 and the lead wire 18', the electromagnetic coil 1 vibrates in accordance with the frequency of the alternating current to drive the piston 9. The reciprocating motion of the piston 9 causes a cooling medium fed through the suction port 16 to flow in the housing 19 in the direction shown by arrows (dotted lines) in the figure. The cooling medium is caused to flow further through the internal suction pipe 16' into the compression cylinder 11. The high pressure cooling medium compressed by the piston 9 is discharged in the direction shown by arrows (solid lines) in the figure into the condenser of the refrigerating system, for example, via the discharge pipe 17' and the discharge port 17. Needless to say, the suction and discharge of the cooling medium in the compression cylinder 11 are accomplished as the suction valve 10 and the discharge valve 12 are alternately opened and closed according to the reciprocating motion of the piston 9.

In the foregoing, the construction and operation of the vibrating compressor of this invention have been described. In this invention, the use of inexpensive ferrite magnet in place of conventional expensive alnico magnets contributes much to reduced manufacturing costs, and the use of ferrite magnets having an arc-shaped crosssection prevents the increase of the outside diameter of the vibrating compressor, which otherwise would be inevitable with ferrite magnets. Furthermore, consideration is given in this invention to ensuring uniform magnetic flux density in the direction normal to the axis of the annular magnetic gap 5 throughout the overall length thereof by making the axial length (the length in the axial direction) of the ferrite magnets 2 larger than that of the opposing magnetic pole 4', as shown in FIG. 6A. Needless to say, this is to ensure the efficient operation of the electromagnetic coil 1. If the annular magnetic gap 5 was formed by the ferrite magnets 2 having the same axial length as that of the magnetic pole 4', as shown in FIG. 1, the magnetic flux density travelling in the axial direction in the annular magnetic gap 5 would not be uniform, with the flux density in the axial direction in the vicinity of both ends of the annular magnetic gap 5 smaller than that in other parts of the gap 5. As is generally known, this is due to the magnetic flux leakage phenomenon which occurs in the end faces parallel to the magnetizing direction in a permanent magnet. This flux leakage is pronounced, particularly in ferrite magnets having smaller thicknesses in the magnetizing direction, as used in this invention. In this invention, the axial length of the ferrite magnets 2 is made larger than that of the magnetic pole 4' to reduce the effect of the flux leakage phenomenon on at least the annular magnetic gap 5. By doing so, magnetic flux density becomes uniform throughout the overall axial length of the annular magnetic gap 5. Moreover, in order to ensure the efficient operation of the vibrating compressor, it is necessary to cause the electrical system to vibrate in such a frequency as to coincide with the intrinsic vibration period of the mechanical vibration system, as described above. In other words, the alternating current fed to the electromagnetic coil 1 must coincide with the abovementioned period. If the vibrating compressor of this invention uses a d-c power source, for example, an inverter for converting direct current to alternating current is required, and the switching operation required for converting d-c to a-c in the inverter must be accomplished in such a timing as to coincide with the aforementioned period. The switching operation in the inverter has already been described earlier, referring to the inverter using transistors, as shown in FIG. 4. It has also been described that the switching condition of the transistors used in the inverter is Collector current $I_C \geq$ base current $I_B \times$ amplification factor $h_{FE}$ Consequently, the more the change rate of the drive current i of the electromagnetic coil 1 at the switching time is, or the more the amount of protrusion (as shown in FIG. 1) of the electromagnetic coil 1 from the annular magnetic gap 5 is at the point of time of completion of compression and suction, the more positively the switching operation based on the abovementioned switching condition can be performed, as has already been described. Needless to say, the switching operation must be positively performed at either time of completion of compression or suction. However, the amount of protrusion of the electromagnetic coil 1 from the annular magnetic gap 5 depends on the neutral position of the coil 1 in the annular magnetic gap 5 because of the limited amplitude of the electromagnetic coil 1. That is, if the amount of protrusion at the time of completion of compression is increased, that at the time of suction is inevitably reduced. Therefore, to ensure positive switching operation at either time of completion of compression or suction, the amount of protrusion of the electromagnetic coil 1 during operation should be equal at any time of completion of compression and suction. In general, the vibration stroke of the vibrating compressor of the construction shown in FIG. 6 tends to be smaller in the direction of compression and larger in the direction of suction with respect to the neutral position. This is because of the high pressure spplied by the compressed cooling medium during compression. Consequently, if the neutral position of the electromagnetic coil 1 agrees with the axial center (the center of the length in the axial direction) of the annular magnetic gap 5, the amount of protrusion of the electromagnetic coil 1 during operation becomes uneven, with the amount of protrusion at the time of completion of compression being smaller than that at the time of completion of suction.

Taking into account this fact, the neutral position of the electromagnetic coil 1 in the annular magnetic gap 5 in the vibrating compressor of this invention is disposed offset in the direction of compression, as shown in FIG. 6, so that the amount of protrusion of the coil 1 at the time of completion of compression becomes equal to that at the time of completion of suction during operation. Although, the relative position of the electromagnetic coil 1 and the annular magnetic gap 5 is determined by the design standards based on the specifications of the vibrating compressor, for instance if the ratio of the compression stroke of the coil 1 to the suction stroke is 1:2 with respect to the neutral position, the axial center of the coil at the neutral position is disposed offset in the direction of compression by half the compression stroke with respect to the axial center of the annular magnetic gap 5.

Figure 7A:
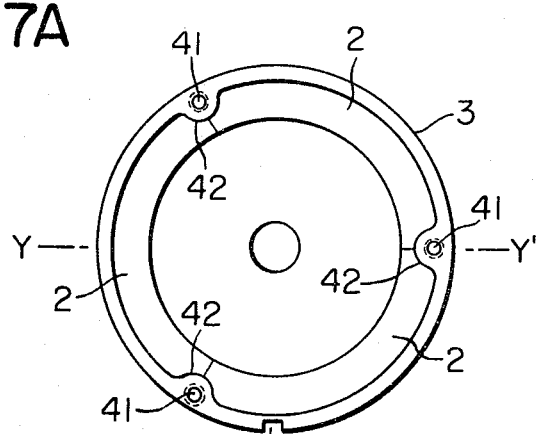
FIG. 7A is a diagram of assistance in explaining an embodiment of this invention as illustrated in FIG. 6 where consideration is given to reducing the outside diameter of the vibrating compressor.
Figure 7B:
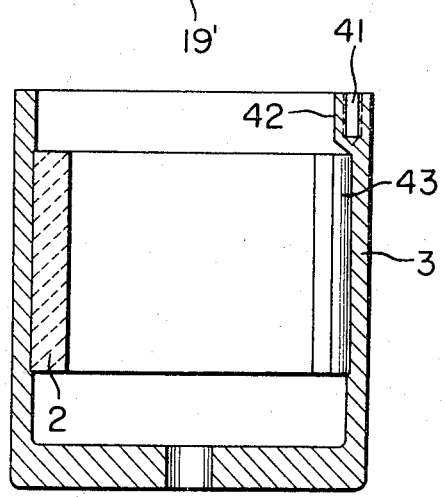
FIG. 7B is a crosssection taken substantially along the line Y—Y' of FIG. 7A.
Figure 8A:
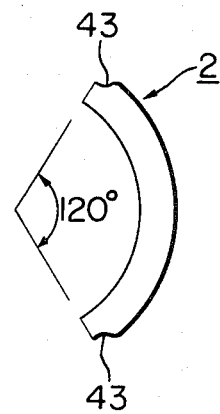
FIGS. 8A and 8B are a plan view and a side elevation, respectively, of the ferrite magnets shown in FIG. 7.
Figure 8B:
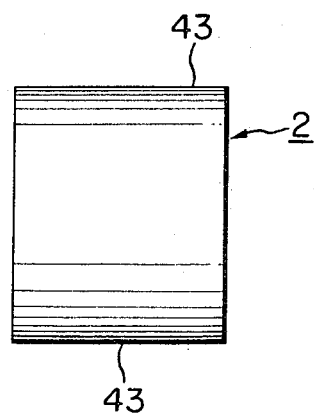

FIG. 7 is a diagram illustrating the state where consideration is given in the vibrating compressor of this invention to reduction of the outside diameter of the compressor. FIG. 7A is a plan view of the external iron core and the ferrite magnets in the construction shown in FIG. 6. FIG. 7B is a crosssection taken along the line Y—Y' in FIG. 7A. FIGS. 8A and 8B are a plan view and a side elevation of the ferrite magnets shown in FIG. 7.

In the figures, numeral 41 refers to threaded holes; and 42 to projections. As is apparent from FIG. 6, the outside diameter of the vibrating compressor is determined by the outside diameter of the external iron core 3. In the vibrating compressor embodying this invention, consideration is given to reducing the outside diameter of the external iron core 3 without sacrificing the effective magnetic flux of the external iron core 3. That is, the projection 42 on which the threaded holes 41 are provided for receiving the cylinder fixing bolts 15 are formed on the internal circumference of the external iron core 3, as shown in FIG. 7. Moreover, engaging grooves 43 for engaging with the projections 42 are provided axially on the ferrite magnets 2 disposed along the internal circumference of the external iron core 3, as shown in FIG. 8. With these arrangements, the ferrite magnets 2 can be snugly fitted to the internal circummerence of the external iron core 3 by inserting the magnets 2 into the external iron core 3 while engaging the grooves 43 with the projections 42.

A pipe groove 19' shown in FIG. 7A is a groove for leading the discharge pipe 17' shown in FIG. 6A from the bottom to the top in FIG. 6A. This helps to prevent the outside diameter of the vibrating compressor from being unwantedly increased.

The arrangement of the vibrating compressor without the projections 42 on the internal circumference of the external iron core 3, as shown in FIGS. 6 and 7, would be as follows.

In general, it is necessary in this type of vibrating compressor to integrally fixing the cylinder block 13 and the external iron core 3 shown in FIG. 6A by any appropriate means. For this reason, in the conventional type of vibrating compressor in which ferrite magnets 2 are not used, the wall thickness of the external iron core 3 is increased to allow the threaded holes 41 to be provided on the end face of the external iron core 3, whereby the cylinder block 13 and the external iron core 3 are integrally fastened by means of the bolts 15. Moreover, the discharge pipe 17' is led from the bottom to the top in FIG. 6A through the space between the external iron core 3 and the housing 19.

If the ferrite magnets 2 are to be disposed in the annular magnetic gap 5, as in the case of this invention, the outside diameter of the vibrating compressor, in other words, the outside diameter of the housing 19 would have to be increased. To obtain the vibrating compressor using ferrite magnets of the same outside diameter as that of the conventional type of vibrating compressor, therefore, the wall thickness of the external iron core 3 and the space between the external iron core 3 and the housing 19 would have to be reduced. This would make it difficult to fasten the external iron core 3 and the cylinder block 13 and to provide enough space for leading the discharge pipe 17' from the bottom to the top of the compressor.

The construction described referring to FIG. 7A through 8B successfully satisfies the aforementioned conflicting requirements.

In the construction shown in FIG. 7 as an embodiment of this invention, the projections 42 have a minimum crosssection required for providing the threaded holes 41. This permits to minimize the reduction of the volume of the magnets 2 caused by the provision of the engaging groove 43. Thus, the internal circumference of the ferrite magnets 2 defining the annular magnetic gap 5 can be formed into an essentially condinuous cylindrical surface without sacrificing the magnetic characteristics of the ferrite magnets 2.

The embodiment shown in FIGS. 7 and 8 has the ferrite magnets 2 divided into three arc-shaped pieces the center angle of which is 120°. However, the magnets 2 may be formed into an integral cylindrical shape with engaging grooves having a crosssectional shape corresponding to that of the projections 42 being provided in the axial direction at locations corresponding to the projections 42. Furthermore, FIGS. 7 and 8 show an embodiment where the adjoining ferrite magnets 2 are disposed in close contact with each other. To facilitate assembly work, however, slight gaps may be provided between the adjoining magnets 2.

As described above, this invention makes it possible to provide a vibrating compressor in which consideration is given to reducing manufacturing costs by employing arc-shaped ferrite magnets as the permanent magnets thereof as well as to minimizing the external size thereof.

What is claimed is:

1. A vibrating compressor having a cup-shaped external iron core; a plurality of permanent magnets formed into arc-shaped pieces the center angle of which includes 360° and disposed along the internal circumference of the external iron core; an internal iron core having a cylindrical magnetic pole 4' facing said permanent magnets at a predetermined gap and forming a magnetic path, together with the external iron core wherein an electromagnetic coil vibratably supported by a mechanical vibration system is disposed in an annular magnetic gap formed by a space defined by the permanent magnets and the cylindrical magnetic pole of the internal iron core, and an alternating current is fed to the electromagnetic coil to drive a piston connected to the electromagnetic coil, said permanent magnets being made of ferrite magnets, the ferrite magnets being formed in such a fashion that the axial length thereof is longer than the axial length of the cylindrical magnetic pole formed on the internal core so as to ensure uniform magnetic flux density in the annular magnetic gap, said electromagnetic coil, in the state where the alternating current is not fed thereto, being disposed in such a manner that the axial center of the electromagnetic coil is positioned at an offset location at least in the direction of compression of the piston with respect to the axial center of the annular magnetic gap.

2. A vibrating compressor set forth in claim 1 characterized in that the external iron core has a plurality of projections which protrude toward the internal circumference thereof and are engaged with engaging grooves formed on each side end face of the ferrite magnets disposed along the internal circumference of the external iron core.

3. A vibrating compressor set forth in claim 1 characterized in that threaded holes are provided on the projections formed on the external iron core for connecting a cylinder block to the external iron core by means of bolts.

4. A vibrating compressor set forth in claim 1 characterized in that a pipe groove is provided in the longitudinal direction along the external circumference of the external iron core to accommodate a discharge pipe.

* * * * *